United States Patent [19]

Atkinson et al.

[11] Patent Number: 4,535,819
[45] Date of Patent: Aug. 20, 1985

[54] VALVE ASSEMBLY

[75] Inventors: Gordon E. Atkinson, Cedarville; Stephen J. Kubina, Dayton, both of Ohio

[73] Assignee: Vernay Laboratories, Inc., Yellow Springs, Ohio

[21] Appl. No.: 616,997

[22] Filed: Jun. 4, 1984

[51] Int. Cl.³ ............................................. F16K 15/14
[52] U.S. Cl. .................................... 137/846; 604/122; 604/247
[58] Field of Search ............... 137/846, 847, 849, 850; 604/83, 86, 122, 247

[56] References Cited

U.S. PATENT DOCUMENTS

| | | | |
|---|---|---|---|
| 2,138,605 | 11/1938 | Landis | 137/846 X |
| 3,789,871 | 2/1974 | Tupper | 137/850 X |
| 3,822,720 | 7/1974 | Souza . | |
| 3,901,272 | 8/1975 | Banners et al. . | |
| 4,341,239 | 7/1982 | Atkinson . | |

Primary Examiner—Robert G. Nilson
Attorney, Agent, or Firm—Biebel, French & Nauman

[57] ABSTRACT

A valve assembly is disclosed for use within a flow path for permitting relatively free flow in said flow path in a first direction and for preventing flow in said path in a second, opposite direction. The assembly includes a resilient flow regulator including a pair of lips arranged in a converging relationship to define a normally closed slit at the outer ends of the lips. An annular flange extends outwardly about the opposite end of the regulator. A housing outlet portion defines a housing interior approximating the shape of the regulator, having a pair of planar surfaces corresponding to the pair of lips. The housing outlet portion further includes an annular collar disposed outwardly adjacent the base of each planar surface. The regulator is disposed within the housing outlet portion with the flange contained within the collar, with the lips being adjacent to but not in contact with the planar surfaces. A cover plate is attached to the collar for securing the regulator and for sealing the housing. Each of the planar surfaces of the housing interior includes a raised portion formed thereon adjacent its base and extending along at least a portion thereof. The raised portions are each formed of a height sufficient to cause the raised portion to contact the lip surface adjacent thereto.

7 Claims, 5 Drawing Figures

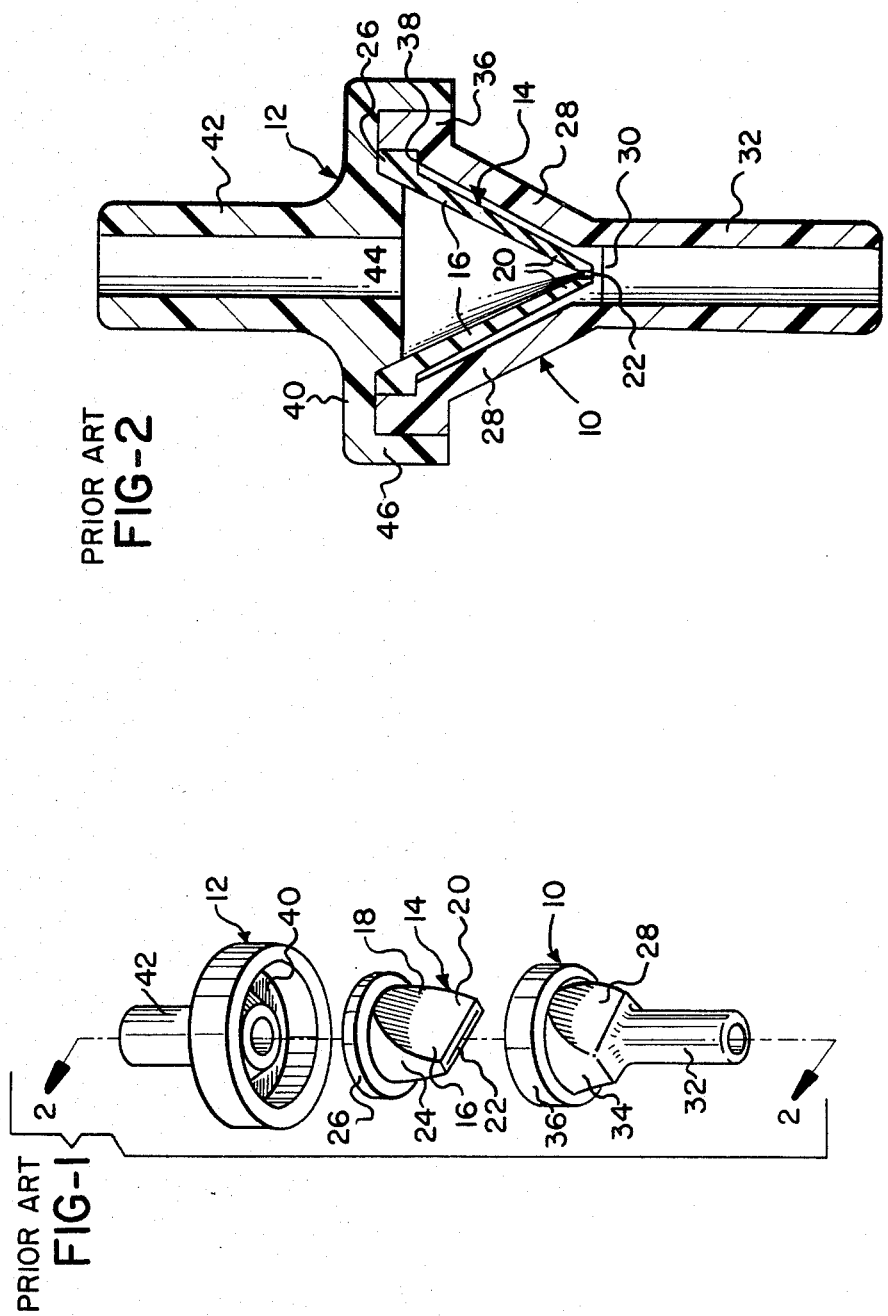

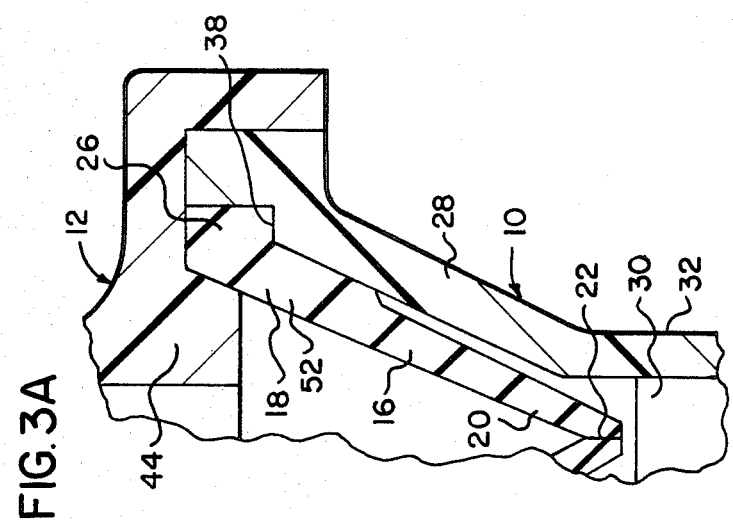
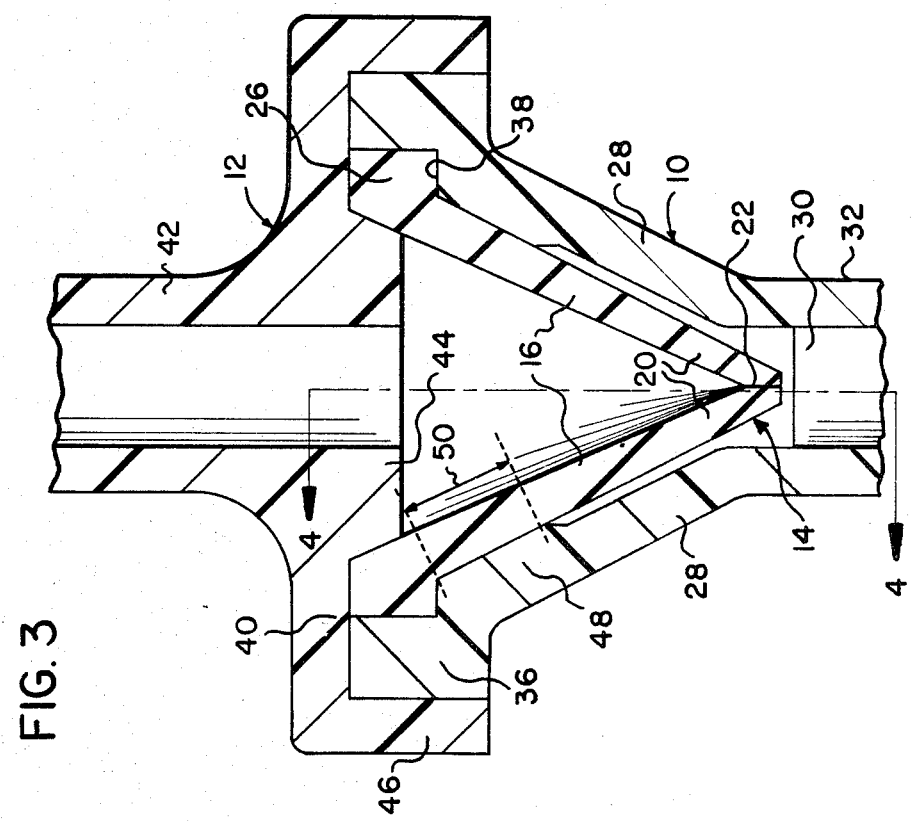

VALVE ASSEMBLY

BACKGROUND OF THE INVENTION

The present invention relates generally to flow regulation apparatus, and more particularly, to a valve assembly adapted to permit substantially free flow through the valve in a first direction, while preventing flow through the valve in a second, opposite direction. Even more particularly, the present invention relates to valves commonly known as the "duckbill" type.

Duckbill valves have been known for some time and have been used in a variety of applications, several examples being shown in U.S. Pat. Nos. 3,822,720 and 3,901,272. Such a valve typically includes a housing into which is mounted a resilient flow regulator member having as its primary operative components a pair of lips arranged in a converging relationship from an open end at the base of the lips to a normally closed outer end. At the normally closed end of the regulator, the lips are located adjacent each other so as to define a normally closed slit therebetween. The regulator is mounted within the housing in a sealed relationship so that flow through the housing must pass through the regulator as well. In a first or forward direction, flow enters the housing and passes into the regulator through the open end, moving toward the normally closed end. The flow pressure against the resilient lips opens the slit, allowing the flow to pass out of the regulator and the housing. When flow enters the housing from a second or reverse direction, however, flow contacts the regulator at its normally closed end, with the flow pressure against the resilient lips holding the slit in its closed position, thereby preventing flow through the valve assembly.

Frequently, valves of this type are used in medical environments, and one application for the valve is as part of a medical solution administration set. Such a set is used to deliver fluids such as plasma, medicines and the like from a fluid supply source, such as a bottle or bag, intravenously to a patient. The valve assembly is disposed within a fluid conduit to prevent flow in a backward direction toward the source, and is typically included in an administration set having a Y-site located downstream from the valve into which medicine or other fluids are injected at a pressure higher than the primary fluid flow.

One problem encountered with use of duckbill valves of conventional design in an administration set arises from the fact that whenever fluid flow is commenced through the valve, air bubbles typically collect around the valve assembly. Once fluid flow is established, these bubbles must be carried away with the fluid flow, so that they will not obstruct or interfere with the smooth and metered flow of fluid through the administration set.

A solution to this problem is described in commonly assigned, U.S. patent application Ser. No. 536,108, in which a duckbill valve assembly similar to that shown in FIGS. 1 and 2 is disclosed. Referring to these drawings, the assembly housing includes an outlet portion 10 and a cooperating inlet portion 12. Portions 10 and 12 are preferably molded from a transparent acrylic plastic material, although many other materials could also be used, depending upon the particular application for the valve assembly.

A flow regulator member 14, molded as a single piece from a material such as rubber or resilient plastic, is formed in a roughly conical, hollow shape. A pair of lips 16 form a portion of regulator 14, each lip 16 having a base region 18 and an outer end 20. Lips 16 are disposed in a converging relationship so that lips 16 are adjacent each other at their outer ends 20. Lips 16 thus form a normally closed slit 22 to define a normally closed end for regulator 14.

Curved side walls 24 interconnect lips 16 and define an open end for regulator 14 opposite slit 22. An outwardly extending flange 26 is formed around the open end of regulator 16 adjacent the bases 18 of lips 16.

Outlet portion 10 of the housing defines a housing interior that approximates the shape of regulator 14. A pair of planar walls 28 forming part of outlet portion 10 define a pair of planar surfaces for the housing interior. Planar walls 28 are arranged in a converging relationship toward outlet end 30 of portion 10, whereat an outlet port 32 communicates with the housing interior.

Planar walls 28 are interconnected by curved walls 34, and an annular collar 36 extends around the open end of outlet portion 10. As a result, an annular shelf surface 38 is defined, so that regulator 14 may be positioned within the housing interior by placement of flange 26 of regulator 14 against collar 36 and shelf surface 38. When so placed, lips 16 are disposed substantially adjacent to but not in contact with planar walls 28 of outlet portion 10. Outer ends 20 of lips 16 are then located at the outlet end 30 of outlet portion 10, so that fluid flow passing through slit 22 is directed into outlet port 32.

The housing inlet portion 12 includes a circular cover plate 40 through which an inlet port 42 communicates. A boss 44 is carried on cover plate 40 centered on the plate and having inlet port 42 opening therethrough. A circular sealing ring 46 extends perpendicularly from cover plate 40.

As shown in FIG. 2, after regulator 14 is placed within outlet portion 10, inlet portion 12 is positioned thereon so that sealing ring 46 surrounds annular collar 36, and so that boss 44 extends into regulator 14 for holding the regulator in position. Inlet and outlet portions 10 and 12 are fastened together along the portions of sealing ring 46 and cover plate 40 that are in contact with annular collar 36, to provide a sealed housing for regulator 14.

Housing portions 10 and 12 may be fastened by a variety of methods. For example, a glue or adhesive may be applied along annular collar 36. However, since the valve assemblies are manufactured in large quantities, it has been found preferable to seal the housing portions 10 and 12 by ultrasonic welding, a process in which the parts to be joined are stimulated by ultrasonic vibrations to achieve sufficient atomic movement to cause coalesence. While such a technique considerably speeds up the assembly process, it also causes problems in the performance of many of the valve assemblies produced.

During the welding process, housing portions 10 and 12 are subjected to ultrasonic vibrations typically having a frequency in the range of 20–40 kHz. As a result, the interior component (i.e., regulator 14) will have a tendency to "dance" within housing portions 10 and 12 until the portions are welded to firmly secure regulator 14 in place. Additionally, some radial twisting of the housing portions following their assembly but prior to complete welding is unavoidable due to practical limitations in construction of the valve assembly and the welding equipment. In either case, despite precise placement of regulator 14 within outlet and inlet portions 10 and 12, the regulator 14 in a percentage of valve assemblies produced will be radially twisted within the housing, and after welding, will be secured in such a position. However, as can be seen from FIG. 2, relatively little clearance is provided between lips 16 of regulator 14 and planar surfaces 28 of outlet portion 10 to discourage air bubble formation and to facilitate bubble clearance during fluid flow initiation through the valve. Consequently, only a relatively little twisting of regulator 14 will cause regulator 14 to contact the interior surfaces of outlet portion 10. Due to the resilient nature of regulator 14, such contact will cause distortion of the regulator 14 with the result that slit 22 at the outer ends of lips 16 can be prevented from fully closing. This in turn prevents the valve assembly from completely preventing fluid flow through the assembly in the reverse direction.

What is needed therefore, is a modification to the housing structure of a duckbill valve assembly as shown in FIGS. 1 and 2 that will prevent unwanted twisting of the regulator within the valve housing during ultrasonic welding of the housing. Such a modification should not affect the ability of the valve assembly to prevent air bubble formation and facilitate bubble removal during flow initiation, nor should it interfere with valve assembly manufacturing procedures so as to complicate or make more expensive the production of such assemblies.

SUMMARY OF THE INVENTION

The present invention may be incorporated within a valve assembly for use within a flow path for permitting relatively free flow along the path in a first direction and for preventing flow in the path in a second, opposite direction. A flow regulator is constructed as a single piece from a resilient material, and includes a pair of lips, each of the lips having a lip base and an outer end. The lips are arranged in a converging relationship to define for the regulator an open end adjacent the lip bases, and a normally closed end at the lip outer ends, whereat the lips are disposed adjacent each other to define a normally closed slit therebetween. The regulator further includes one side wall interconnecting the lips, and an annular flange extending outwardly at the open end.

A housing outlet portion defines a housing interior approximating the shape of the regulator. The housing interior has a pair of planar surfaces corresponding to the pair of lips, each of the planar surfaces having a planar surface base. The surfaces are arranged in a converging relationship from the planar surfaces bases toward an outlet end, the housing outlet portion further including an outlet port communicating with the outlet end. An annular collar is disposed outwardly adjacent the planar surface bases. A housing inlet portion includes a cover plate and an inlet port communicating therethrough.

The regulator is disposed within the housing outlet portion with its annular flange contained within the annular collar and with the lip outer ends extending toward the outlet end of the housing interior. The lips are substantially adjacent to, but not in contact with, the planar surfaces of the housing interior. The cover plate is attached to the annular flange for securing the regulator and for sealing the housing interior.

In order to solve the problem set forth above, each of the planar surfaces of the housing interior is provided with a raised portion formed thereon adjacent the planar surface base and extending along at least a portion of the planar surface. Each of the raised portions is formed of a height sufficient to cause the raised portion to contact the adjacent one of lips.

In an alternative embodiment, the raised portions may be formed on the regulator lips adjacent each lip base. In such a case, the raised portions are of a height sufficient to cause the raised portion to contact the adjacent planar surface.

Of course, the present invention may be applied to devices other than duckbill valve assemblies. It will be particularly useful in a device wherein a resilient member is secured within a rigid housing, and in which it is desirable that radial twisting of the member during assembly be minimized.

Accordingly, it is the primary object of the present invention to provide a housing construction for a duckbill valve assembly or similarly formed device in which the housing interior conforms closely to the regulator configuration to inhibit air bubble formation and facilitate bubble clearance during flow initiation, but in which the regulator is securely held to prevent radial twisting of the regulator during assembly of the valve housing. Additional objects of the invention are to provide such a valve assembly in which the additional regulator securing means does not affect either the valving performance or the air bubble prevention and clearance characteristics of the housing construction; and in which the additional regulator securing means does not require additional steps in the production of a valve assembly, and does not significantly increase the complexity of the components of the valve assembly or increase their cost of production.

Other objects and advantages of the present invention will be apaprent from the following description, the accompanying drawings, and the appended claims.

BRIEF DESCRIPTION OF THE DRAWINGS

FIG. 1 is an exploded view of a duckbill valve assembly of a type to which the present invention may be applied;

FIG. 2 is a sectional view taken generally along line 2—2 of FIG. 1, but showing the valve assembly in an assembled state;

FIG. 3 is an enlarged sectional view similar to FIG. 2, but showing the assembly housing constructed according to the present invention;

FIG. 3A is a view similar to a portion of FIG. 3, but showing an alternative embodiment for the present invention.

DETAILED DESCRIPTION OF THE PREFERRED EMBODIMENT

Figure 4:
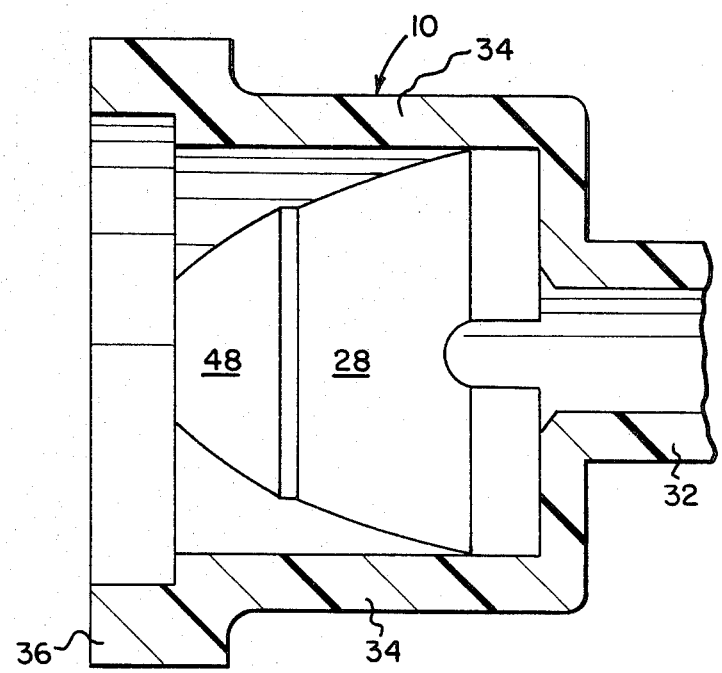
FIG. 4 is a view of the outlet housing portion, taken generally along line 4—4 of FIG. 3.

The valve assembly of the present invention is best seen by reference to FIGS. 3 and 4. However, other than the improvement provided by the present invention, which will be described in detail, the valve assembly is similar to that shown in FIGS. 1 and 2, and accordingly, like reference numerals are applied to like parts.

As can be seen in FIG. 2, each lip 16 of the regulator 14 is held within the housing interior so as to be slightly separated from planar surfaces 28 of housing outlet portion 10. It has been discovered, however, that the provision of a raised portion 48, shown in FIG. 3, along each planar surface 28 at its base and adjacent to annular collar 36, will significantly reduce the proportion of faulty valves produced as a result of radial twisting of regulator 14. Each raised portion 48 extends fully across its respective planar surface 28, as shown in FIG. 4, and is of a height sufficient to cause contact between raised portion 48 and the adjacent lip 16 of regulator 14. However, raised portion 48 is of a height only sufficient to contact lip 16 and does not exert any loading force on the regulator 14. Thus, the presence of raised portions 48 does not affect the ability of regulator 14 to be dropped into the housing interior defined by outlet portion 10 during assembly of the valve.

Both of raised portons 48 extend along equal percentages of the length of their respective planar surface 28. Various length dimensions, as indicated by arrow 50 in FIG. 3, have been experimentally tested, ranging from 25% to 40% of the total length of the planar surface 28. While extending raised portion 48 for approximately 25% of planar surface 28 significantly decreased the proportion of faulty valve assemblies produced, a raised portion 48 occupying approximately 40% of the length of planar surface 28 was found to produce even fewer faulty valve assemblies.

Since a raised portion of 40% of the length of planar surface 28 was found to produce satisfactory results, no further experimentation was conducted. Therefore, such a value is preferred to the extend that tests have been conducted. However, it will be recognized that other values may produce similar or even better results, and are therefore to be considered within the scope of the present invention.

It is believed that the present invention obtains its results by providing additional support along the lips 16 of regulator 14 to prevent its tendency to twist radially during ultrasonic welding of outlet and inlet portions 10 and 12 of the valve housing. However, it is not possible simply to provide a valve housing that fits closely against the entire regulator 14, since this would interfere with the ability of lips 16 to operate properly to achieve satisfactory valve action. Provision of raised portions 48 along planar surfaces 28, at least to the extent experimentally tested, has been found not to be detrimental in this regard.

As an alternative embodiment to the present invention, the raised portions can be applied to regulator 14 rather than to outlet portion 10 of the valve assembly housing. As shown in FIG. 3A, raised portion 52 extends outwardly from lip 16 at its base 18 for contact with the base of the adjacent planar surface 28 of outlet portion 10. Further, the raised portion 52 is formed on lip 16 to contact percentages of the length of planar surface 28 that are substantially the same as those occupied when the raised portion is formed on surface 28. In either embodiment, the effective result is substantially the same.

In general, the present invention contemplates forming both regulator 14 and housing outlet portion 10 so as to define a contact surface betweeen a lip 16 of regulator 14 and the adjacent planar surface 28 of outlet portion 10. The contact surface does not, however, extend over the full length of planar surface 28, and therefore does not affect the performance of the valve assembly, both in its valving functions and its ability to establish fluid flow without excessive air bubble formation and with rapid bubble clearance.

Of course, the present invention can be useful in duckbill valve asemblies in which the housing portions 10 and 12 are joined other than by ultrasonic welding. For example, notwithstanding the advantages of ultrasonic welding in large-scale production of valve assemblies, it could be desirable to secure housing portions 10 and 12 with a suitable adhesive. However, since some setting time is required for virtually all such adhesives, mechanical or manual manipulation of the glued housing prior to complete setting thereof could subject regulator 14 to radial twisting forces. In such a case, use of the raised portions 48 of the present invention would be most beneficial.

Further, it should also be recognized that the present invention can be applied to devices other than duckbill valve assemblies. In cases in which a device includes a resilient member secured within a rigid housing that could be subject to radial twisting, the present invention could be used.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Valve assembly for use within a flow path for permitting relatively free flow in said flow path in a first direction and for preventing flow in said path in a second, opposite direction, comprising:

a flow regulator constructed as a single piece from a resilient material, said regulator including a pair of lips, each of said lips having a lip base and an outer end;

said lips being arranged in a converging relationship to define for said regulator an open end adjacent said lip bases, and a normally closed end at said lip outer ends whereat said lips are disposed adjacent each other to define a normally closed slit therebetween, said regulator further including at least one side wall interconnecting said lips and an annular flange extending outwardly at said open end;

a housing outlet portion defining a housing interior approximating the shape of said regulator, said housing interior having a pair of planar surfaces corresponding to said pair of lips, each of said planar surfaces having a planar surface base, said surfaces being arranged in a converging relationship from said planar surface bases toward an outlet end, said housing outlet portion further including an outlet port communicating with said outlet end and an annular collar disposed outwardly adjacent said planar surface bases; and a housing inlet portion having a cover plate and an inlet port communicating therethrough;

said regulator being disposed within said housing outlet portion with said annular flange contained within said annular collar and said lip outer ends extending toward said outlet end of said housing interior, and with said lips being substantially adjacent to but not in contact with said planar surfaces;

said cover plate being attached to said annular collar for securing said regulator and for sealing said housing interior; and each of said planar surfaces of said housing interior having a raised portion formed thereon adjacent said planar surface base and extending along at least a portion of said planar surface, each of said raised portions being formed of a height sufficient to cause said raised portion to contact the adjacent one of said lips.

2. The valve assembly as defined in claim 1, wherein each of said raised portions extends along approximately 25% to 40% of the length of said planar surface upon which said raised portion is formed.

3. The valve assembly as defined in claim 1, wherein each of said raised portions extends along approximately 40% of the length of said planar surface upon which said raised portion is formed.

4. A housing assembly for containing a resilient member, said resilient member including a body and a flange extending outwardly about the perimeter of said body, said body including at least a portion thereof disposed without and extending in one direction from a plane defined by said flange, said housing assembly comprising:
- a first housing portion having an interior defining an open end and at least a portion of a housing interior, and further having a collar disposed outwardly about said open end for holding therein a portion of said flange, said resilient member body being thereby held within said housing interior in a substantially spaced relationship from said first housing portion; and
- a second housing portion attached to said annular collar for securing said resilient member within the housing assembly;
- said first housing portion interior having at least one raised portion formed thereon adjacent said annular collar and extending along at least a portion of said interior, said raised portion being formed of a height sufficient to cause said raised portion to contact the adjacent surface of said resilient member body.

5. Valve assembly for use within a flow path for permitting relatively free flow in said flow path in a first direction and for preventing flow in said path in a second, opposite direction, comprising:
- a flow regulator constructed as a single piece from a resilient material, said regulator including a pair of lips, each of said lips having a lip base and an outer end;
- said lips being arranged in a converging relationship to define for said regulator an open end adjacent said lip bases, and a normally closed end at said lip outer ends whereat said lips are disposed adjacent each other to define a normally closed slit therebetween, said regulator further including at least one side wall interconnecting said lips and an annular flange extending outwardly at said open end;
- a housing outlet portion defining a housing interior approximating the shape of said regulator, said housing interior having a pair of planar surfaces corresponding to said pair of lips, each of said planar surfaces having a planar surface base, said surfaces being arranged in a converging relationship from said planar surface bases toward an outlet end, said housing outlet portion further including an outlet port communicating with said outlet end and an annular collar disposed outwardly adjacent said planar surface bases; and
- a housing inlet portion having a cover plate and an inlet port communicating therethrough;
- said regulator being disposed within said housing outlet portion with said annular flange contained within said annular collar and said lip outer ends extending toward said outlet end of said housing interior, and with said lips being substantially adjacent to but not in contact with said planar surfaces;
- said cover plate being attached to said annular collar for securing said regulator and for sealing said housing interior; and
- said regulator and said housing outlet portion being formed to define at least one contact surface therebetween such that a portion of one of said planar surfaces substantially at said planar surface base contacts the adjacent one of said lips substantially at said lip base.

6. The valve assembly as defined in claim 5, wherein said contact surface is defined by a raised portion formed on said one planar surface adjacent said planar surface base and extending along at least a portion of said planar surface, said raised portion being formed of a height sufficient to cause said raised portion to contact the adjacent one of said lips.

7. The valve assembly as defined in claim 5, wherein said contact surface is defined by a raised portion formed on said one lip adjacent said lip base and extending along at least a portion of said lip, said raised portion being formed of a height sufficient to cause said raised portion to contact the adjacent one of said planar surfaces.

* * * * *